(12) United States Patent
Gopalakrishna et al.

(10) Patent No.: US 8,774,549 B2
(45) Date of Patent: Jul. 8, 2014

(54) COMPRESSION ERROR HANDLING FOR TEMPORAL NOISE REDUCTION

(75) Inventors: Vatsala Gopalakrishna, Bangalore (IN); Ravi Ananthapurbacche, Bangalore (IN); Peter Swartz, San Jose, CA (US)

(73) Assignees: STMicroelectronics, Inc., Coppell, TX (US); STMicroelectronics International N.V., Amsterdam (NL)

( * ) Notice: Subject to any disclaimer, the term of this patent is extended or adjusted under 35 U.S.C. 154(b) by 280 days.

(21) Appl. No.: 13/250,530

(22) Filed: Sep. 30, 2011

(65) Prior Publication Data
US 2013/0083245 A1    Apr. 4, 2013

(51) Int. Cl.
*G06K 9/40*    (2006.01)

(52) U.S. Cl.
USPC ........... 382/266; 382/260; 382/274; 382/275; 358/3.26; 358/3.27; 358/463

(58) Field of Classification Search
USPC ........ 382/260, 266, 274, 275; 358/3.26, 3.27, 358/463
See application file for complete search history.

(56) References Cited

U.S. PATENT DOCUMENTS

| | | | |
|---|---|---|---|
| 6,184,974 B1 * | 2/2001 | Neal et al. | 356/121 |
| 6,388,736 B1 * | 5/2002 | Smith et al. | 355/53 |
| 6,461,064 B1 * | 10/2002 | Leonard et al. | 400/328 |
| 6,487,307 B1 * | 11/2002 | Hennessey et al. | 382/149 |
| 6,563,566 B2 * | 5/2003 | Rosenbluth et al. | 355/67 |
| 6,793,390 B2 * | 9/2004 | Wang et al. | 378/174 |
| 6,817,982 B2 * | 11/2004 | Fritz et al. | 600/443 |
| 8,031,193 B1 * | 10/2011 | Henderson et al. | 345/426 |
| 8,443,461 B2 * | 5/2013 | Ohnesorge | 850/33 |

* cited by examiner

*Primary Examiner* — Yosef Kassa
(74) *Attorney, Agent, or Firm* — Hogan Lovells US LLP

(57) ABSTRACT

A video processor includes a spatio-temporal noise reduction controller to determine current and previous image edge slopes and adaptively control a spatio-temporal noise reduction processor to blend current and previous images dependent on the current and previous image edge slope values.

47 Claims, 9 Drawing Sheets

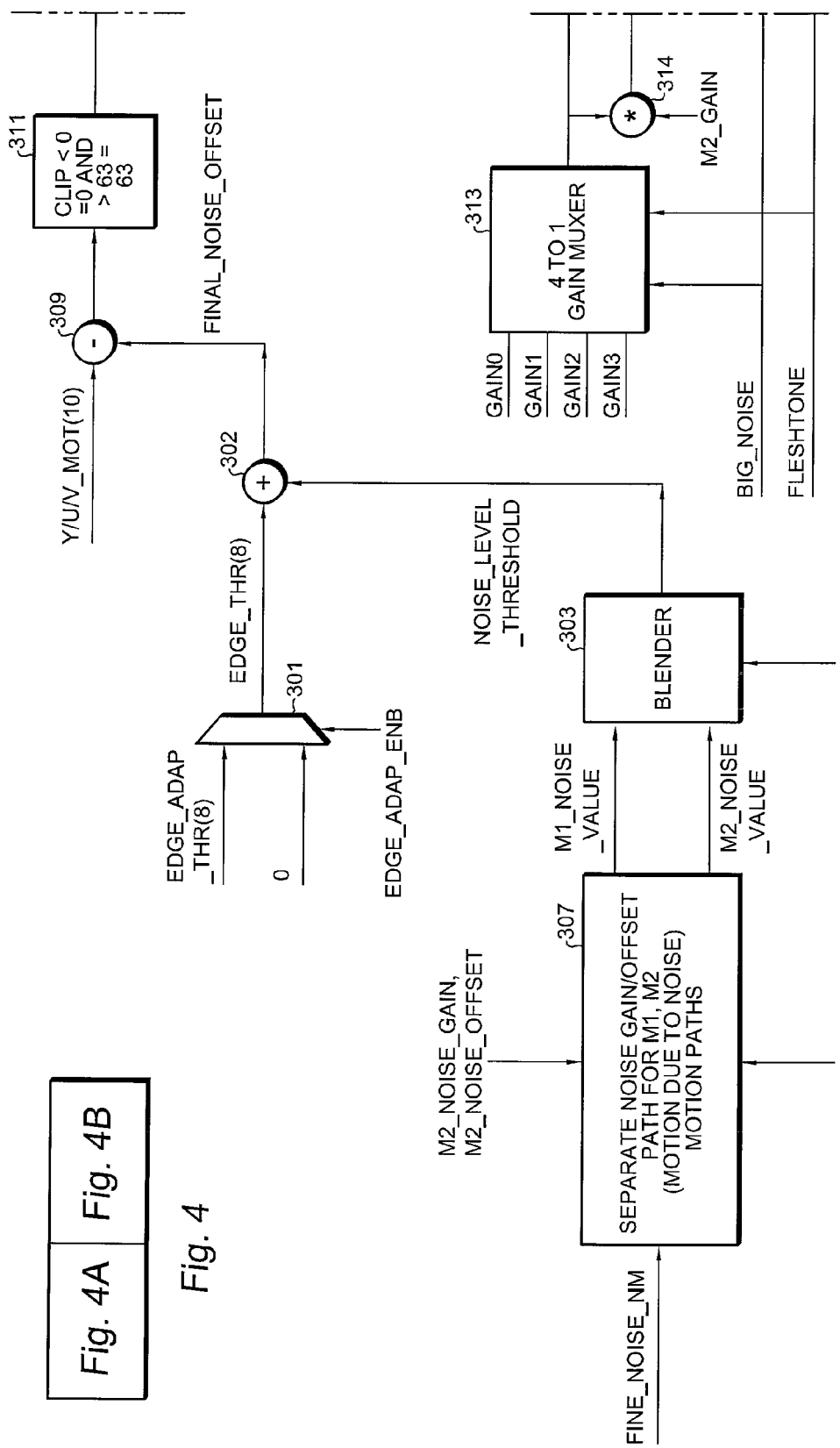

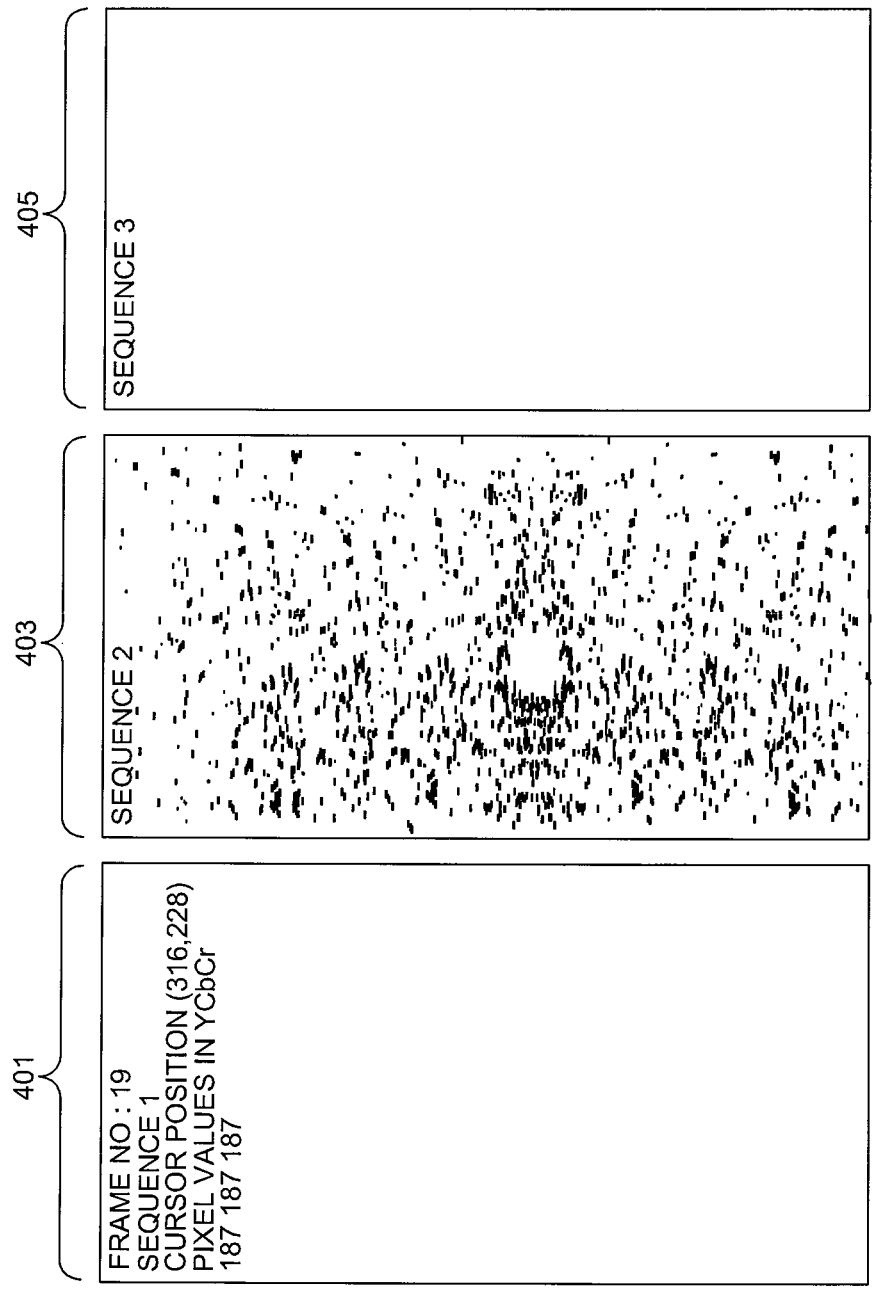

COMPRESSION ERROR HANDLING FOR TEMPORAL NOISE REDUCTION

SCOPE OF THE APPLICATION

The present invention relates to video processing. The invention further relates to but is not limited to noise reduction in video processing.

BACKGROUND OF THE APPLICATION

Video processing, where video image data is processed to 'improve' the image is applied in many devices. Furthermore image quality can be improved by the use of video processing in the form of a noise reduction block or processor to reduce noise in the image.

The video noise reduction block can often be the first stage of any video processing pipeline, where the video image frames are noise reduced before any other processing and enhancements in the digital domain are applied. For example noise reduction can be employed for television applications, where in the video signal can be input or received from any one of radio frequency (RF) channel, component input channel, a high definition multimedia interface (HDMI), a composite (CVBS) channel, and s-video input channel.

Noise reduction can for example be spatial or temporal noise reduction. Spatial noise reduction is where areas surrounding a picture element (or pixel) or block of pixels on the same field or frame can be analysed to determine whether the pixel is similar to the surrounding areas and whether a correction or noise reduction operation can be carried out. The noise reduction operation can be for example an averaging across displayed lines or within a line (intraline and interline noise reduction). Furthermore temporal noise reduction is where a pixel is compared to proceeding or succeeding fields or frame pixels to determine whether or not the area pixel differs significantly from previous or following fields or frames, and whether an averaging or filtering across fields or frames should be carried out. Temporal noise reduction requires previous frames or fields to be stored in order that they can be compared to the current frame or field to determine whether there is image motion.

To reduce the memory size required to store the previous frames or fields, aggressive compression modes such as REMPEG are typically performed. The application of REMPEG compression modes introduce an average error of 35 for a 10 bit domain (i.e. an average error of 35 in the range 0 to 1023) at the high frequency regions or edges. This error can create false motion detection in still image regions, and therefore reduce temporal noise reduction application. This reduces the beneficial effect of temporal noise reduction (TNR) and causes noise reduction to be biased towards applying spatial noise reduction (SNR).

Any such low noise still images in such examples can have greater noise levels when aggressive compression is used as less noise reduction is applied and the images suffers resolution loss.

SUMMARY OF THE INVENTION

Embodiments of the present application aim to address the above problems.

There is provided according to the disclosure a video processor comprising a spatio-temporal noise reduction controller configured to determine current and previous image edge slopes and adaptively control a spatio-temporal noise reduction processor to blend current and previous images dependent on the current and previous image edge slope values.

The video processor may further comprise a spatio-temporal noise reduction processor configured to blend current and previous images dependent on the spatial noise reduction controller.

The spatiotemporal noise reduction controller may comprise: a current image edge slope determiner configured to generate a current image edge slope value; a previous image edge slope determiner configured to generate a previous image edge slope value; and a edge slope processor configured to determine a blending control signal dependent on the current image edge slope value and previous image edge slope value for the spatiotemporal noise reduction processor.

The edge slope processor may comprise a slope selector configured to select one of the current image edge slope value and the previous image edge slope value and generate the blending control signal value dependent on the selected edge slope value.

The edge slope processor may comprise a slope value generator configured to combine a portion of the selected edge slope value to a blended gain value to generate a slope value, the control signal value being dependent on the slope value.

The edge slope processor may comprise a first blended gain value generator configured to generate the blended gain value dependent on at least one of: the noise level status of the image region, and an image region motion status value.

The slope selector may be configured to select at least one of: the minimum of the current image edge slope value and the previous image edge slope value, the maximum of the current image edge slope value and the previous image edge slope value, and the average of the current image edge slope value and the previous image edge slope value.

The slope selector may be configured to select at least one of the edge slope values dependent on at least one of: the noise level status of the image region, and an image region motion status value.

The video processor may further comprise a motion noise detector configured to determine at least one of: the noise level status of the image region, and an image region motion status value.

The edge slope processor may be configured to selectively nullify the motion noise value for at least one of: image edges, and regions of high frequency image components.

The current and previous image edge slopes may be current luma image edge slopes and previous luma image edge slopes.

The current and previous images may comprise: a current frame image and a previous frame image respectively; and a current field image and a previous field image respectively.

The edge slope value may comprise at least one of: horizontal pixel difference, and vertical pixel difference.

A television receiver may comprise the video processor as discussed herein.

An integrated circuit may comprise the video processor as discussed herein.

A video player may comprise the video processor as discussed herein.

According to a second aspect there is provided a method of processing video signals comprising: determining current and previous image edge slopes; and adaptively controlling spatio-temporal noise reduction blending of current and previous images dependent on the current and previous image edge slope values.

The method may further comprise spatio-temporal noise reduction blending of current and previous images dependent on the current and previous image edge slope values.

Adaptively controlling spatio-temporal noise reduction blending of current and previous images may comprise: generating a current image edge slope value; generating a previous image edge slope value; and determining a blending control signal dependent on the current image edge slope value and previous image edge slope value for the spatio-temporal noise reduction processor.

Determining a blending control signal may comprise: selecting one of the current image edge slope value and the previous image edge slope value; and generating the blending control signal value dependent on the selected edge slope value.

Determining a blending control signal may comprise combining a portion of the selected edge slope value to a blended gain value to generate a slope value, the control signal value being dependent on the slope value.

Determining a blending control signal may comprise generating the blended gain value dependent at least one of the noise level status of the image region, and an image region motion status value.

Selecting one of the current image edge slope value and the previous image edge slope value may comprise selecting at least one of: the minimum of the current image edge slope value and the previous image edge slope value, the maximum of the current image edge slope value and the previous image edge slope value, and the average of the current image edge slope value and the previous image edge slope value.

Selecting one of the current image edge slope value and the previous image edge slope value may comprise selecting at least one of the edge slope values dependent on at least one of the noise level status of the image region, and an image region motion status value.

The method may further comprise determining the portion of the selected edge slope value dependent on at least one of: a noise level status of the image region, and an image region motion status value.

The method may further comprise determining at least one of: the noise level status of the image region, and an image region motion status value.

Determining the noise level of the image may comprise selectively nullifying the motion noise value for at least one of: image edges, and regions of high frequency image components.

The current and previous image edge slopes may be current luma image edge slopes and previous luma image edge slopes.

The current and previous images may comprise: a current frame image and a previous frame image respectively; and a current field image and a previous field image respectively.

The edge slope value may comprise at least one of: horizontal pixel difference, and vertical pixel difference.

A processor-readable medium encoded with instructions that, when executed by a processor, may perform a method for processing video as discussed herein.

Apparatus comprising at least one processor and at least one memory including computer code for one or more programs, the at least one memory and the computer code configured to with the at least one processor may cause the apparatus to at least perform a method as discussed herein.

According to a third aspect there is provided a video processor comprising: means for determining current and previous image edge slopes; and means for adaptively controlling spatiotemporal noise reduction blending of current and previous images dependent on the current and previous image edge slope values.

The video processor may further comprise means for spatiotemporal noise reduction blending of current and previous images dependent on the current and previous image edge slope values.

The means for adaptively controlling spatio-temporal noise reduction blending of current and previous images may comprise: means for generating a current image edge slope value; means for generating a previous image edge slope value; and means for determining a blending control signal dependent on the current image edge slope value and previous image edge slope value for the spatio-temporal noise reduction processor.

The means for determining a blending control signal may comprise: means for selecting one of the current image edge slope value and the previous image edge slope value; and means for generating the blending control signal value dependent on the selected edge slope value.

The means for determining a blending control signal may comprise means for combining a portion of the selected edge slope value to a blended gain value to generate a slope value, the control signal value being dependent on the slope value.

The means for determining a blending control signal may comprise means for generating the blended gain value dependent on at least one of: the noise level status of the image region, and an image region motion status value.

The means for selecting one of the current image edge slope value and the previous image edge slope value may comprise means for selecting at least one of: the minimum of the current image edge slope value and the previous image edge slope value, the maximum of the current image edge slope value and the previous image edge slope value, and the average of the current image edge slope value and the previous image edge slope value.

The means for selecting one of the current image edge slope value and the previous image edge slope value may comprise means for selecting at least one of the edge slope values dependent on at least one of: the noise level status of the image region, and an image region motion status value.

The means for combining a portion of the selected edge slope value to a blended gain value to generate a slope value may comprise means for determining the portion of the selected edge slope value dependent on at least one of: a noise level status of the image region, and an image region motion status value.

The video processor may further comprise means for determining at least one of: the noise level status of the image region, and the image region motion status value.

The means for determining the blending control signal edge slope may comprise means for selectively nullifying the motion noise value at at least one of: image edges, and regions of high frequency image components.

The current and previous image edge slopes may be current luma image edge slopes and previous luma image edge slopes.

The current and previous images may comprise: a current frame image and a previous frame image respectively; and a current field image and a previous field image respectively.

The edge slope value may comprise at least one of: horizontal pixel difference, and vertical pixel difference.

BRIEF DESCRIPTION OF THE DRAWINGS

For better understanding of the present application, reference will now be made by way of example to the accompanying drawings in which:

FIG. 5 shows an example of the K logic plot of the noise reducing apparatus according to some embodiments of the application;

DETAILED DESCRIPTION OF EMBODIMENTS

The following describes in further detail suitable apparatus and possible mechanisms for the provision of video processing and noise reduction.

Figure 1:
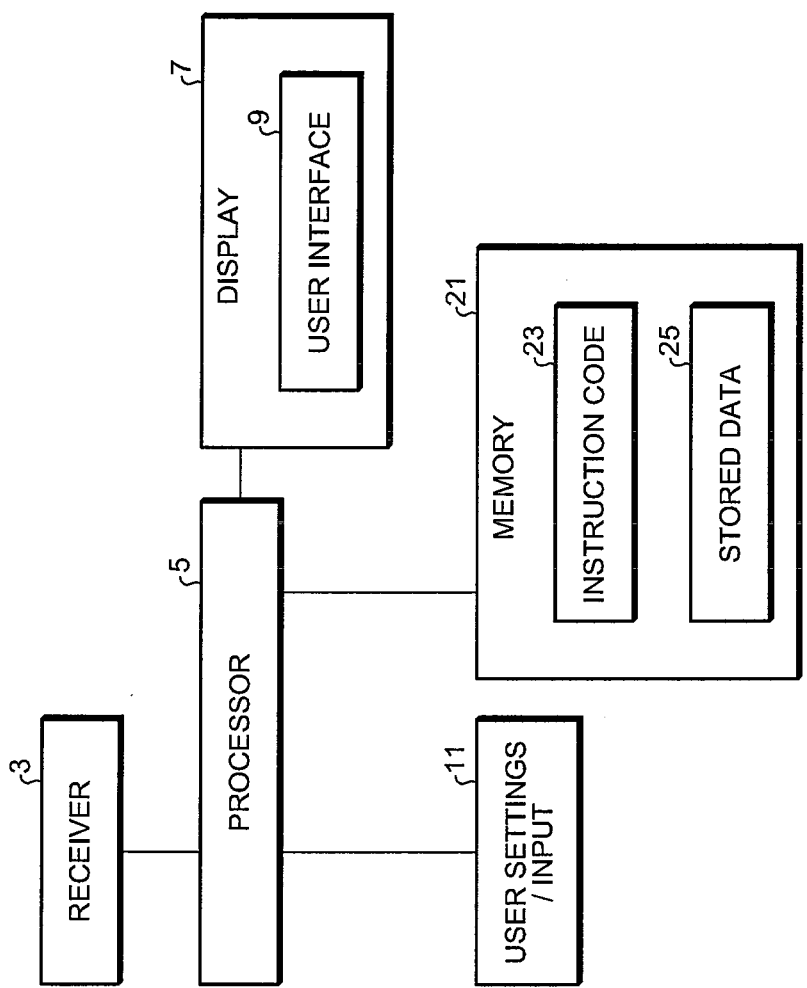
FIG. 1 shows schematically a system suitable for employing a video processor according to some embodiments of the application.

With respect to FIG. 1 an example electronic device or apparatus 10 is shown within which embodiments of the application can be implemented.

The apparatus 10 in some embodiments comprises a receiver configured to receive a radio frequency modulated television and/or video signal and output the analogue encoded video signal to the processor 5. In some embodiments the receiver can be controlled by the processor to demodulate/select the channel to be received.

The apparatus 10 in some embodiments comprises a processor 5 which can be configured to execute various program codes. The implemented program codes can comprise video processing for processing the received video data, for example by noise reduction video processing, and outputting the data to the display 7. The implemented program codes can be stored within a suitable memory.

In some embodiments the processor 5 can be coupled to memory 21. The memory 21 can further comprise an instruction code section 23 suitable for storing program codes implementable upon the processor 5. Furthermore in some embodiments the memory 21 can comprise a stored data section 25 for storing data, for example video data. The memory 21 can be any suitable storage means. In some embodiments the memory 21 can be implemented as part of the processor in a system-on-chip configuration.

The apparatus 10 can further comprise a display 7. The display can be any suitable display means featuring technology for example cathode ray tube (CRT), light emitting diode (LED), variable backlight liquid crystal display (LCD) for example LED lit LCD, organic light emitting diode (OLED), and plasma display. The display 7 can furthermore be considered to provide a graphical user interface (GUI) providing a dialog window in which a user can implement and input how the apparatus 10 displays the video. In some embodiments the apparatus can be configured to communicate with a display remote from the physical apparatus by a suitable display interface, for example a High Definition Multimedia Interface (HDMI) or a Digital Video Interface (DVI) or be remodulated and transmitted to the display.

The apparatus 10 further can comprise a user input or user settings input apparatus 11. The user input can in some embodiments be a series of buttons, switches or adjustable elements providing an input to the processor 5. In some embodiments the user input 11 and display 7 can be combined as a touch sensitive surface on the display, also known as a touch screen or touch display apparatus.

Figure 2:
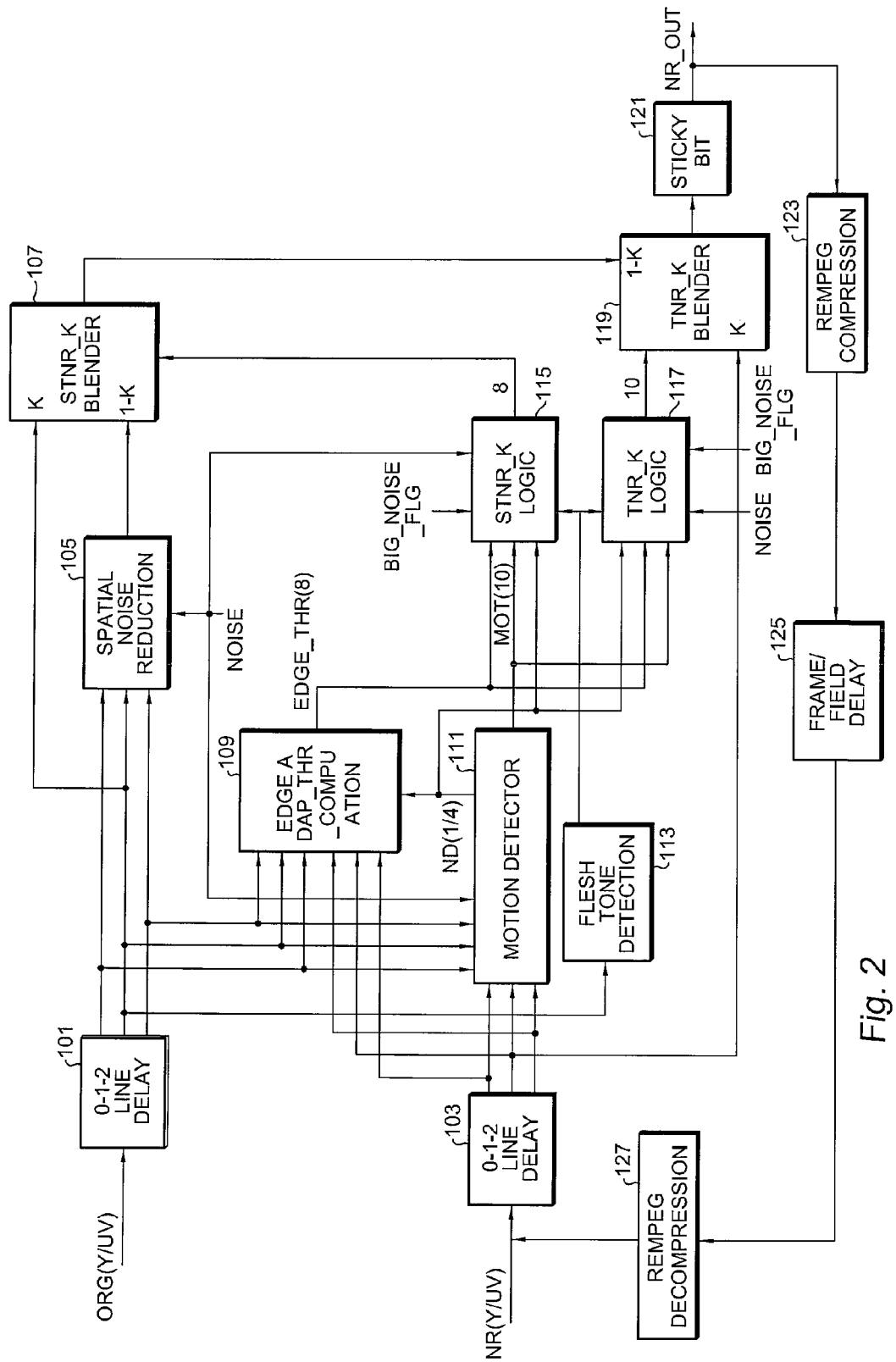
FIG. 2 shows schematically a video noise reduction apparatus according to some embodiments of the application.

With respect to FIG. 2, the noise reduction apparatus is shown in further detail. Furthermore with respect to FIG. 7 the operation of the noise reduction apparatus is described. In some embodiments the noise reduction apparatus comprises an input line delay 101. The input line delay 101 is configured to receive the original (ORG) input video signal on a line by line basis and can comprise any suitable means for delaying or storing a previous line or previous lines of input data. In some embodiments the input to the line delay 101 comprises either the input chroma or luma data. The input line delay 101 can in some embodiments be configured to output current, previous, and next line data to a spatial noise reduction apparatus 105, a spatial-temporal noise reducer blender 107, an edge adaptive threshold determiner 109, a motion detector 111, and a flesh tone detector 113.

In some embodiments the noise reduction apparatus can further comprise a noise reduced line delay 103. The noise reduced line delay 103 can be configured to receive the previous frame (or field) delayed video input on a line by line basis in such a manner that the line data held in the noise reduced line delay are those associated or synchronised with the line data held in the input line delay. In other words the noise reduced line delay samples are one frame away from the line data samples held in the input line delay.

The previous frame/field information can in some embodiments comprise data which had been stored after a first compression sequence and then decompressed after storage. The output of the noise reduced line delay 103 can in some embodiments be passed to an edge adaptive threshold determiner 109, the motion detector 111, and a temporal noise reduction blender 119.

Figure 7:
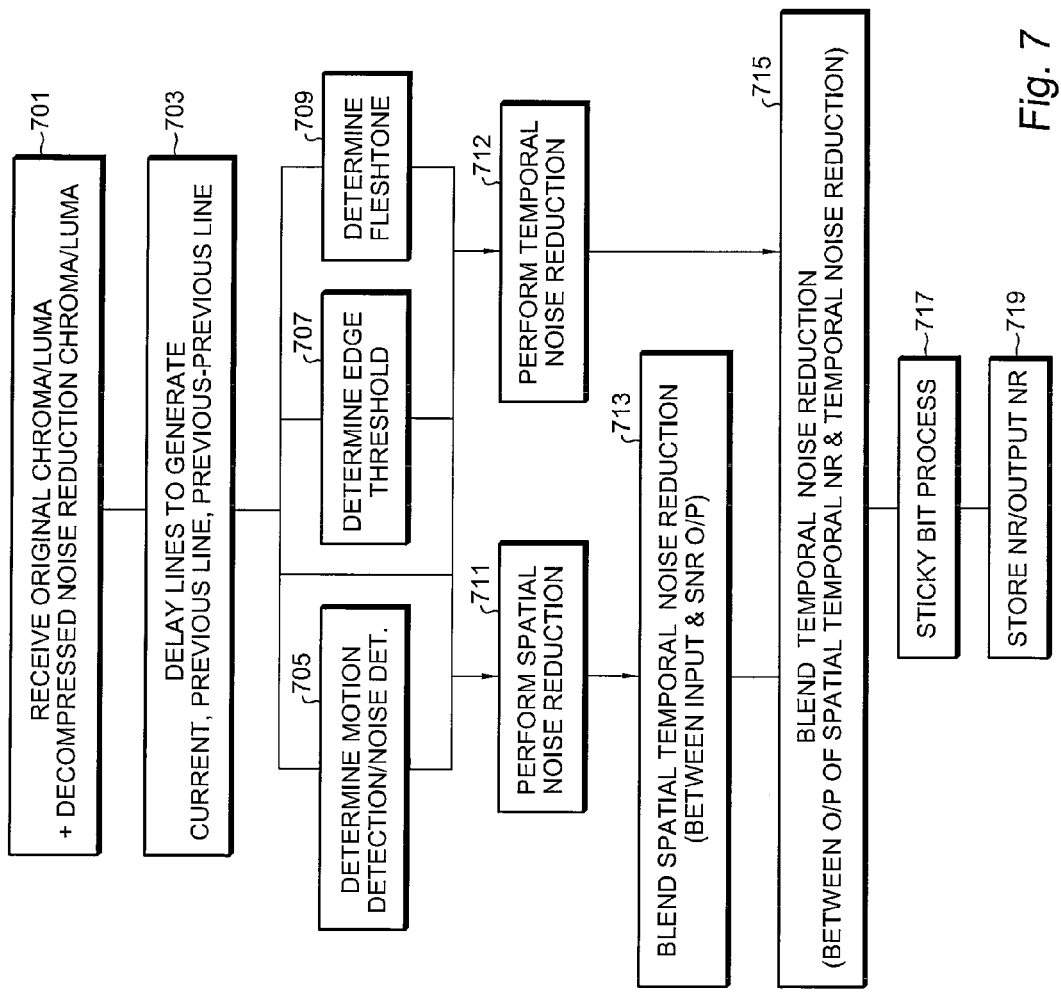
FIG. 7 shows a method of operating the noise reduction apparatus according to some embodiments of the application.

The operation of receiving the original chroma or luma data and the decompressed "noise reduced" chroma or luma data is shown in FIG. 7 by step 701.

The delaying of the original and decompressed lines to generate a current, previous line, and next line data for the original and decompressed noise reduced chroma or luma data is shown in FIG. 7 by step 703.

In some embodiments the noise reduction apparatus comprises a spatial noise reducer 105. The spatial noise reducer 105 can be configured to attempt to reduce the noise level for a line of data dependent on the input line information from the input line delay 101. The spatial noise reducer 105 can perform any suitable spatial noise reduction algorithm such as, but not exclusively, linear interpolation between lines, line sharpening, edge sharpening, and low pass filtering. The output of the spatial noise reducer 105 can be output to the spatial temporal noise reducer blender 107. In some embodiments the spatial noise reducer 105 can be configured to further receive a noise level value input for controlling the amount of spatial noise reduction performed. The noise level value can be received from a noise measurement block not shown in the figure.

The operation of performing spatial noise reduction is shown in FIG. 7 by step 711.

In some embodiments the noise reduction apparatus further comprises a motion detector 111. The motion detector 111 can be configured to receive the input video data from the first line delay 101, and the previous frame or field(s) video data via the noise reduction line delay 103. The motion detector can thus compare the difference between the various line delay inputs from frame-to-frame or field-to-field to determine whether or not there is any motion between the original and delayed/stored image.

Furthermore in some embodiments the motion detector can be configured to perform some noise detection. The noise detection value is based on determining how many motion samples are above the noise level value (the noise level present in the input noisy video signal) and can in some embodiments be determined in a noise measure block (not shown) in a specified spatial image kernel. The motion is determined to be due to real motion or noise by this measure of number of motion samples being above some noise level. If in a specific region (defined by kernel size) if more number of motion samples is above noise level, then that region is assumed to have real motion, else that region is assumed to be have false motion due to noise. Based on this determination a different motion filter is used for deriving the actual motion value. The Motion detector outputs a control signal ND, which indicates whether the motion is due to Noise or real motion.

The motion detector 111 can thus be configured to output a determination or value of the motion of between the original and delayed frame lines. This motion determination can be output to the spatial temporal noise reduction control logic 115 and to the temporal noise reduction control logic 117. Furthermore in some embodiments the noise detection output from the motion detector 111 can be configured to be output to the edge adaptive threshold determiner 109, spatial temporal noise reduction control logic 115 and temporal noise reduction control logic 117.

The operation of determining motion and/or determining noise is shown in FIG. 7 by step 705.

In some embodiments the noise reduction apparatus comprises a flesh tone detector 113. The flesh tone detector 113 can be configured to determine whether or not the current line image contains flesh tone information. The output of the flesh tone detector 113 can be configured to output to the spatial temporal noise reduction control logic 115 and the temporal noise reduction control logic 117. The fleshtone detection therefore helps in identifying human skin colour and in those areas the noise reduction strength can be different than the non-fleshtone areas. This therefore assists in some embodiments by preventing 'plastic' skin effects.

Figure 8:
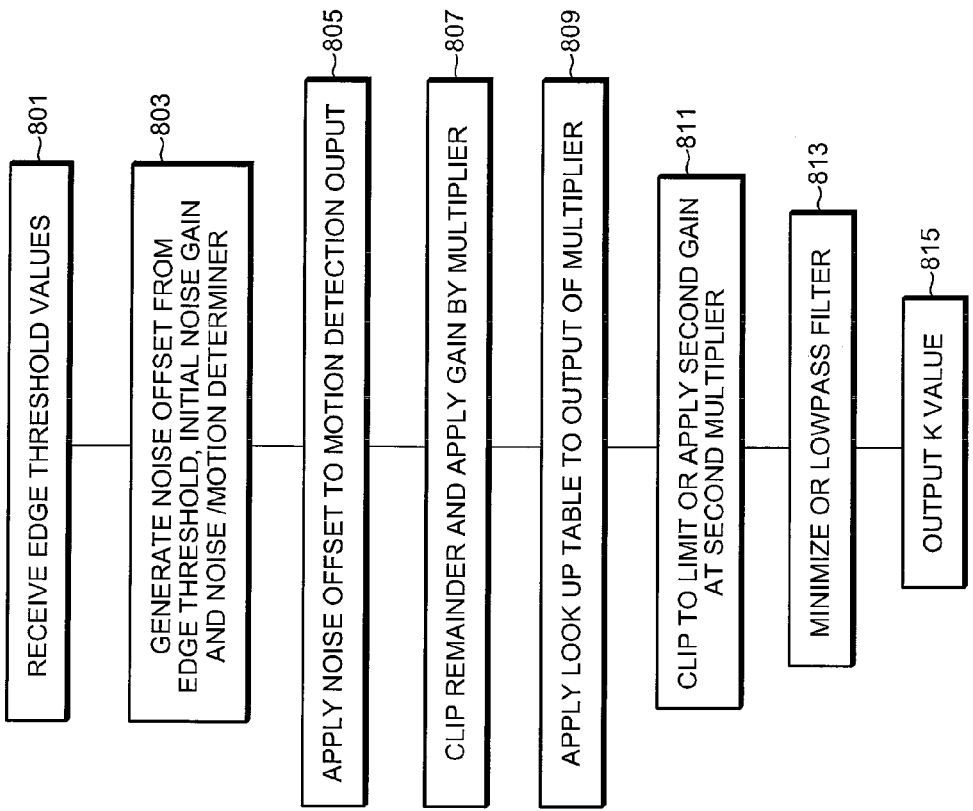
FIG. 8 shows the operation of the K logic.

The operation of determining flesh tone in the current line is shown in FIG. 8 by step 709.

In some embodiments the noise reduction apparatus comprises an edge adaptive threshold determiner 109. The edge adaptor threshold determiner 109 can be configured to receive the line information from the original image (from the image line delay 101), and the previous frame or field image data (from the noise reduced line delay 103). The edge adaptive threshold determiner 109 can further be configured to receive an input from the noise detector output from the motion detector 111. The edge adaptive threshold determiner 109 can be configured to generate an edge detection threshold value such that luma edge image portions can be detected. The edge detection threshold can be used so that for spatial or temporal noise reduction, a suitable edge profile or slope can be allowed for. The output of the edge threshold value from the edge adaptive threshold determiner 109 can be passed to the spatial temporal noise reduction control logic 115 and the temporal noise reduction control logic 117.

The determination of the edge threshold value is shown in FIG. 7 by step 707.

The performing of spatial noise reduction is shown in FIG. 7 by step 711.

The noise reduction apparatus can further comprise in some embodiments a spatial temporal noise reduction (STNR) control logic 115. The spatial temporal noise reduction control logic 115 can be configured to receive the motion detection output from the motion detector 111, the noise detection output from the motion detector 111, the edge threshold value from the edge adaptive threshold determiner 109, as well as a big noise flag input and noise level value input and a flesh tone determination input. The spatial temporal noise reduction control logic 115 can be configured to generate a control value to be passed to a spatial temporal noise reduction blender 107 such that the output of the spatial noise reduction circuit and the original line to be analysed are blended according to the various inputs to the STNR control logic 115.

In some embodiments the noise reduction apparatus can comprise a spatial temporal noise reduction blender 107. The spatial temporal noise reduction (STNR) blender 107 can be configured to receive data inputs from the spatial noise reduction apparatus 105 and the input line delay 101 and further be controlled by the STNR control logic 115 to blend the line information.

The STNR blender 107 can be configured to perform any suitable blending operation dependent on the output of the STNR control logic 115. The output of the STNR blender 107 can be passed to the temporal noise reduction blender 119.

The operation of blending the spatial noise reduction output and the current frame line data is shown in FIG. 7 by step 713.

The performing of temporal noise reduction is shown in FIG. 7 by step 712.

Furthermore in some embodiments the noise reduction apparatus comprises a temporal noise reduction (TNR) control logic 117. The temporal noise reduction control logic 117 can be configured to receive the motion detection output from the motion detector 111, the noise detection output from the motion detector 111, the edge adaptive threshold determiner edge threshold value from the edge adaptive threshold determiner 109, the flesh tone detection output from the flesh tone detector 118, and the noise and big noise flag inputs to determine a suitable control value to be passed to the temporal noise reduction blender 119. The noise input is as discussed herein the input video signal noise level value from noise measure block and the Big Noise flag (also from noise measure block) is an indicator indicating that the input video has high level of noise.

In some embodiments the noise reduction apparatus can further comprise a temporal noise reduction blender 119. The temporal noise reduction blender 119 can be configured to receive the output from the spatial temporal noise reduction blender 107 and further the previous frame or field image data from the previous noise reduction line delay 103 and further to blend the inputs dependent on the output of the temporal noise reduction control logic 117 to produce a blended TNR output. The blended TNR output 119 can be passed in some embodiments to a sticky bit converter 121.

The operation of blending the current and previous image data to perform temporal noise reduction is shown in FIG. 7 by step 715.

In some embodiments the temporal reduction apparatus comprises a sticky bit converter 121. The sticky bit converter 121 can be configured to output a sticky bit converted TNR blended output. The sticky bit output thus forms the output image line data or the noise reduced data output (NR_OUT).

The operation of performing a sticky bit process on the TNR output is shown in FIG. 7 by step 717.

Furthermore the outputting of the noise reduced image is shown in FIG. 7 by step 719.

Furthermore in some embodiments the noise reduced output can be passed to a REMPEG compression circuit 123. The REMPEG compressor 123 can be configured to perform a REMPEG compression on the output of the noise reduced image data. This output can further pass to a frame/field delay 125. The frame/field delay 125 in some embodiments can comprise memory configured to store the output of the REMPEG compression. The noise reduction apparatus can further comprise a REMPEG decompressor 127 configured to read the memory at a suitable point and further process the REMPEG compressed data by decompressing the data passing the previous frame or field delayed noise reduction output to the noise reduction line delay 103.

Figure 3:
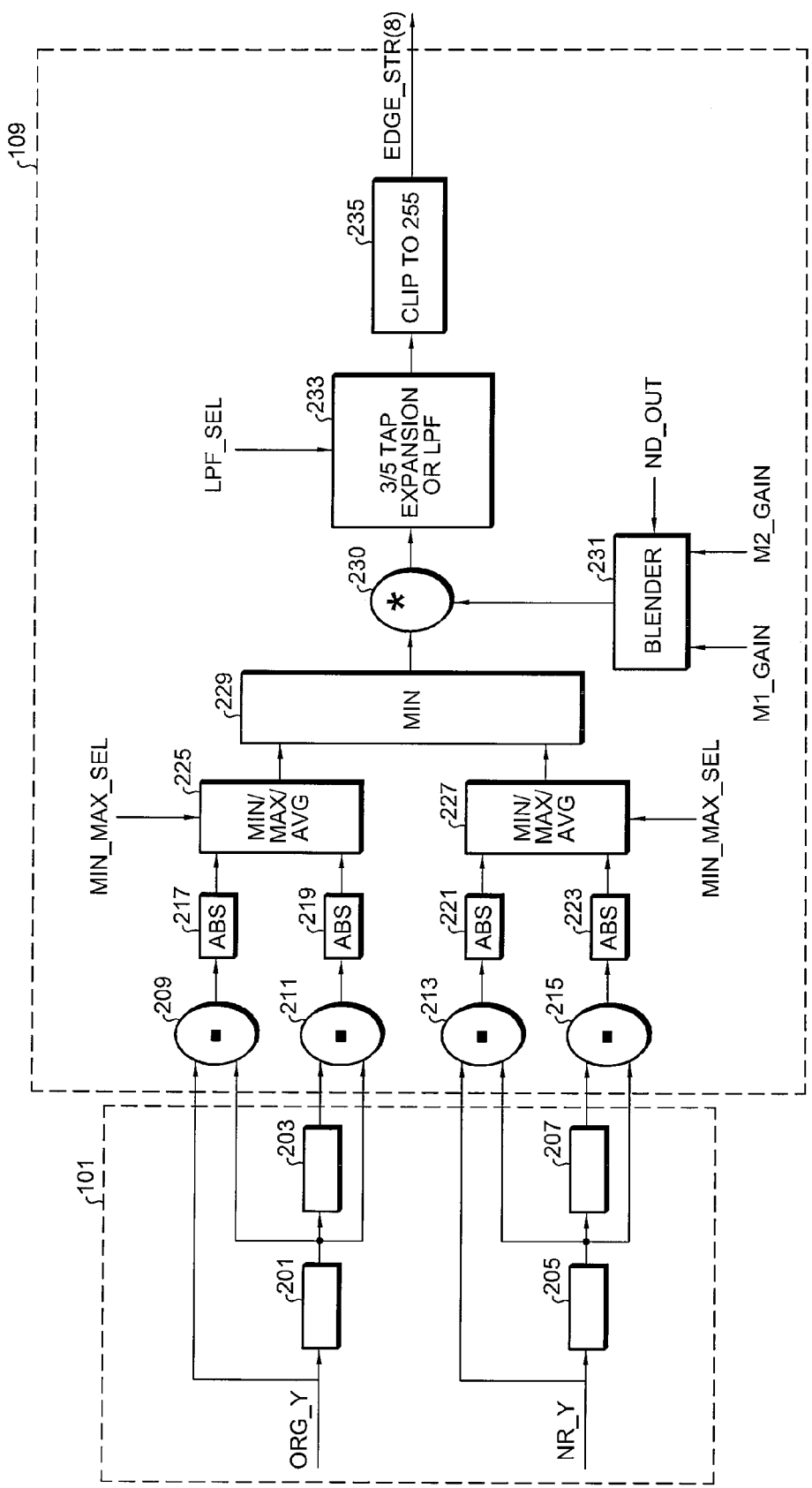
FIG. 3 shows schematically the edge adaptive threshold determiner as shown in FIG. 2 in further detail according to some embodiments of the application.

With respect to FIG. 3, video line delay 101 and noise reduced line delay 103 parts are shown in further detail together with the edge adaption threshold determiner with respect to luma noise reduction embodiments. The input line delay 101 is in some embodiments configured to receive the original luma information, The original signal line delay 101 can be configured to output the current input line luma information (ORG_Y) to a first difference engine 209 of the edge adaptive threshold determiner 109 and to a first pixel delay element 201. The output of the first pixel delay element 201 can be configured to output a delayed pixel information to an input of a second pixel delay 203, and to the first difference engine 209 and to a second difference engine 211. The second pixel delay element 203 can be configured to output the second delayed pixel information to the second difference engine 211.

Similarly the noise reduced delay line 103 input luma information (NR_Y) is input to a third difference engine 213 and a first noise reduced pixel delay 205 which is configured to perform a pixel delay on the received frame/field delayed data and output the delayed pixel information to the third difference engine 213, a fourth difference engine 215 and a second noise reduced pixel delay 207. The output of the second noise reduced pixel delay is passed to the fourth difference engine 215 of the edge adaptive threshold determiner 109. Similarly in some embodiments the vertical difference engine across lines can be used (not shown in figure).

Figure 6:
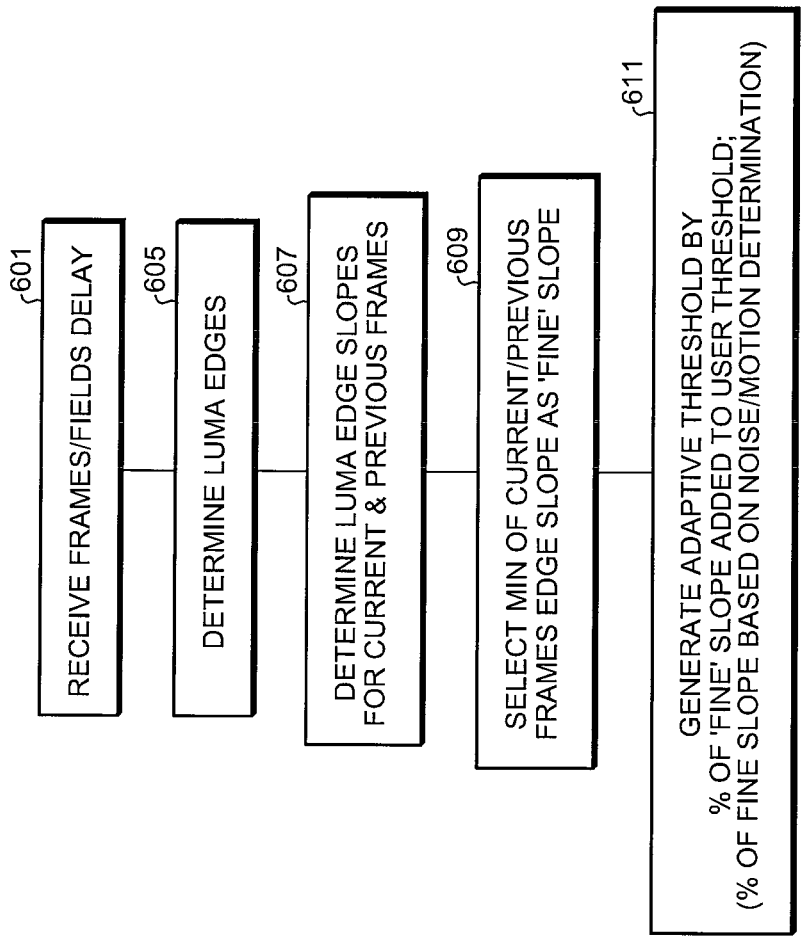
FIG. 6 shows a method of operating the edge adaptive threshold determiner.

The reception of the luma data and the performing of the line delay and pixel delay operations are shown in FIG. 6 by step 601.

In some embodiments the edge adaptive threshold determiner comprises four difference engines. The difference engines are configured to receive spatially different pixel luma information to determine edges. Thus, for example, the first difference engine 209 can be configured to receive the original input luma data and a first pixel delayed luma data input and output a first difference value to a first absolute value determiner 217.

Similarly the second difference engine 211 can be configured to receive the first pixel delay and second pixel delay outputs from the input line delay 101 and be configured to output a second difference value to a second absolute value determiner 219.

The third difference engine 213 and the fourth difference engine 215 can be configured to produce the same difference values for the noise reduced image and pass the difference between the non delayed and first pixel delay to a third absolute value determiner 221 and the difference between the first pixel delay and second delay pixel to a fourth absolute value determiner 223.

The absolute value determiners, the first absolute value determiner 217, second absolute value determiner 219, third absolute value determiner 221, and fourth absolute value determiner 223 can be configured to receive a difference value and output an absolute or modulus value of the input value. In other words the absolute value determiner generates a positive value output independent of the sign of the input value. The first and second absolute value determiners 217 and 219 are configured to output the current frame/field luma line pixel difference values to a first minimum/maximum/averager (associated with the current frame/field 225) and the third and fourth absolute value determiners 221 and 223 are configured to output the previous frame/field luma line pixel difference data to a second minimum/maximum/averager 227.

In some embodiments the minimum/maximum/averager 225, 227 comprises any suitable processor configured to determine the minimum of the values, the maximum of the values and the average of the values and a multiplexer configured to select and output one of the minimum, maximum or average values dependent on the min_max.sel signal. The first minimum/maximum/averager 225 associated with the current frame/field can be configured to output a selected value to a first minimum selector 229 and the second minimum/maximum/averager 227 is configured to output a selected minimum/maximum/average value to the first minimiser 229. The minimum/maximum/averagers can be considered to be providing edge determination values for the current and previous frames/fields. Also in some embodiments the first minimiser block 229 can be a minimum or maximum/average selection based on the ND signal (the Noise detect signal from the Motion detector).

The determination of luma edge operation is shown in FIG. 6 by step 605.

Furthermore the determination of luma edge slopes for the current and previous frames/fields operation as shown in FIG. 6 by step 607.

The minimiser 229 is configured in some embodiments to receive the edge slope values for the current and previous frames/fields and output the minimum value. The minimum edge slope of the current and previous frames/fields can be considered to be the "fine" slope value. The output of the minimiser can be passed to a first multiplier 230.

In some embodiments the edge adaptive threshold determiner 109 further comprises a blender 231 configured to receive the M1 gain and M2 gains. The M1 and M2 gain values are different user programmable gains and can be adaptively selected or blended based on the value of the ND-Out signal. For example when the ND-Out signal indicates a detection of noise then M2 gain value can be selected, else the M1 gain value can be selected. The blender 231 can further be configured to receive the noise detection output (ND-OUT) from the motion detector. The blender 231 is configured to blend the M1 gains and M2 gains to produce a gain output to the multiplier 230. The output of the minimiser 229 and the output of the blender can then be combined in the multiplier 230 to output an adaptive gain value. The adaptive gain value can be output by the multiplier 230 to a ⅗ tap expander or low pass filter device 233. In other words the multiplier 230 can be configured to output an adaptive threshold value as a percentage of the fine slope scaled by the blended M1 and M2 gains.

The tap expander or LPF 233 can be configured to further receive an LPF selection (LPF-SEL) input to determine whether or not to low pass filter the output of the multiplier 230. The output of the expander or LPF can be passed to a clipper 235.

The clipper 235 can be configured to clip the value of the adaptive gain value to a value between 0 and 255 to prevent a value rollover occurring producing an incorrect edge threshold value.

Thus the generation of the adaptive threshold by a percentage of the fine slope added to the user or gain noise level value threshold is shown in FIG. 6 by step 611.

Figure 4B:
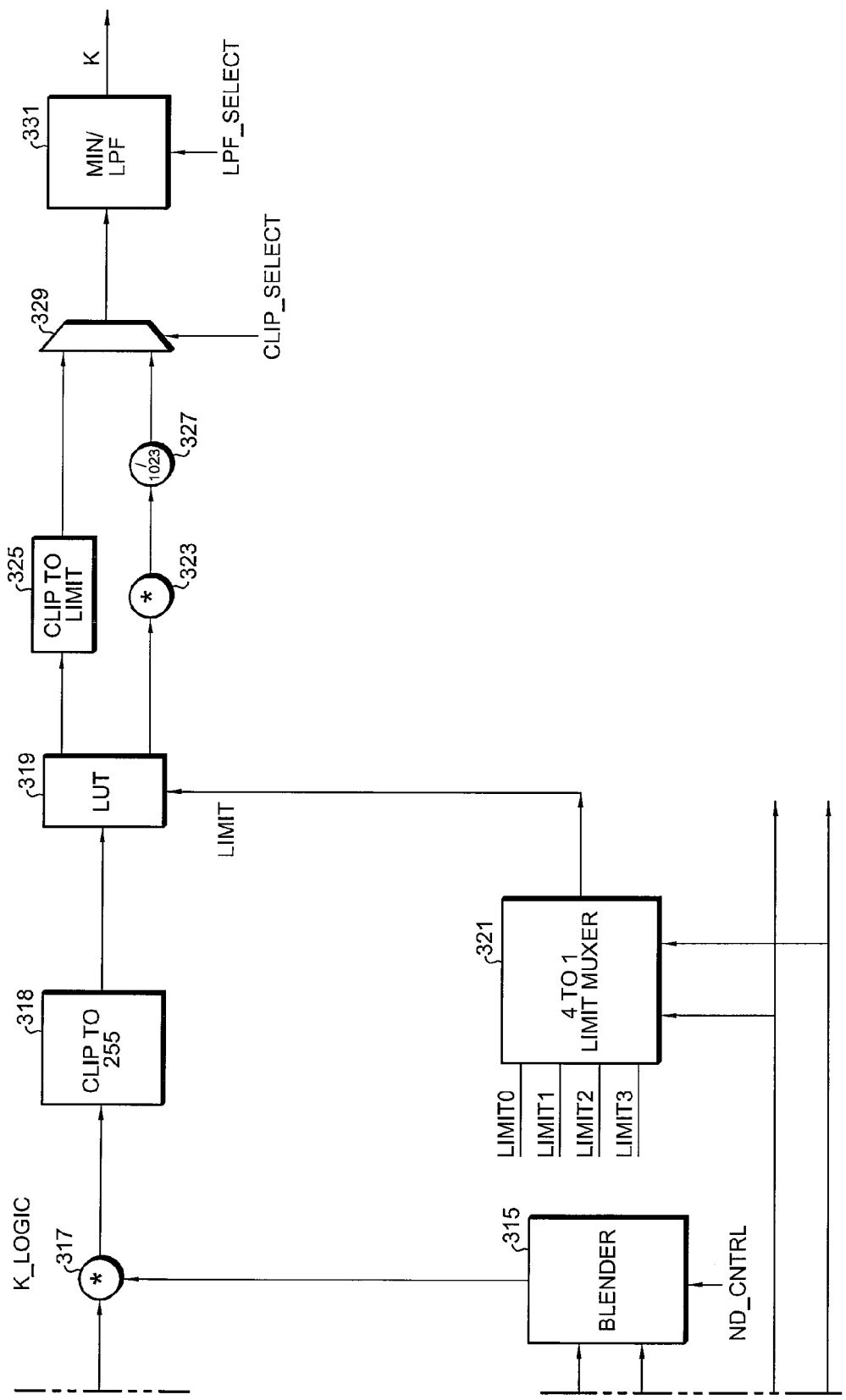
FIG. 4 shows the noise reduction K logic as shown in FIG. 2 in further detail according to some embodiments of the application.

With respect to FIG. 4, the operation of the spatiotemporal noise reduction (STNR) control logic 115 and temporal noise reduction (TNR) K control logic 117 is shown. Furthermore with respect to FIG. 8 the operation of the STNR and TNR K logic is shown in further detail. The K parameter is the control factor of the blend equation. This will control the amount of noise reduction performed. In some embodiments the logic can comprise an edge threshold multiplexer 301. The edge threshold multiplexer 301 can be configured to receive the edge adaptive threshold determined value from the edge adaptive threshold determiner 109 as a first data input, a null or zero value as the second data input, and an enable input such as an edge adaptive enable input (EDGE_ADAP_ENB). The output of the edge adaptive multiplexer 301 can thus be either the edge adaptive threshold value or zero (or null) value which can be passed to a summer 302.

The receiving of the edge threshold values is shown in FIG. 8 by step 801.

In some embodiments the K logic circuitry can comprise a separate noise gain/offset path determiner block 307. The determiner block 307 can be configured to receive the Noise level value of the input video signal from the noise meter (Fine_Noise_NM)) or via a user input. This noise input is multiplied by the user noise_gain input and then added with a signed user noise offset input.

The gain and offset processing is performed separately for M1 (real motion) and M2 (Motion due to Noise) to generate the M1_noise_value and the M2_noise_value.

The M1_noise_gain and M1_noise_offset values are the user input for generating M1_noise_value output and M2_noise_gain and M2_noise_offset are the user input for generating the M2_noise_value output.

In some embodiments the logic circuitry comprises a first or noise determination blender 303. The first blender can blends the above outputs (M1_noise_value, M2_noise_value) based on the ND control from motion detector 111 to generate the Noise_level threshold to summer 302.

Furthermore the K logic circuitry can comprise a summer 302 configured to receive the output of the edge adaptive threshold multiplexer 301 and also a noise level threshold (Noise_level_threshold) from the blender 303. The output of the combination can be passed as a first input to the first subtractor 309.

The operation of generating the final noise offset value from the edge threshold value, and the initial noise gain values is shown in FIG. 8 by step 803.

Furthermore the logic circuitry can in some embodiments comprise a first or motion subtracter 309. The first subtracter 309 can be configured to receive both the final noise offset value from the noise summer 302 and also a motion detection input from the motion detector 111 to find the difference between these values. The output of the first subtracter 309 can in some embodiments be passed to a clipping determiner 311.

The application of the final noise offset to the motion detection output is shown in FIG. 8 by step 805.

In some embodiments the logic comprises a clipping determiner 311. The clipping determiner can be configured to receive the difference between the motion detection value and the final offset value and clip these in such a way that values below 0 are set to 0 and values above 63 are set to 63 in order that the value does not overflow or undertow the value range. The output of the clipper 311 can be passed to the second multiplier 317.

In some embodiments the logic circuitry comprises a gain multiplexer 313. The gain multiplexer can be configured to receive a series of input gains such as shown in FIG. 4 by gain 0, gain 1, gain 2 and gain 3 as input gain data values which are selectable dependent on the selection inputs provided from the flesh tone flag value and the big noise flag value. The gains (gain 0, gain 1, gain 2 and gain 3) are for example user defined gains defining the gains for different combinations of Fleshtone and Big noise status values (00, 01, 10, 11). The output of the gain multiplexer can be passed to the second blender 315.

In some embodiments the logic circuitry further comprise an M2 multiplier 314. The M2 multiplier can be configured to receive the gain multiplexer 313 output and multiply the gain output value by the user M2_gain value, which then can be output to the second input to the second blender 315.

In some embodiments the logic circuitry comprises a second blender 315 configured to receive as a first data input the output of the 4 to 1 gain multiplexer 313 and output gained value (multiplied by user input M2_gain) as a second data input. This blending operation can further be controlled based on the noise detection control signal (ND_CNTRL). The second blender 315 can be configured to output a blended value of these two inputs to the second multiplier 317. The second multiplier 317 can be configured to multiply the clipper 311 values and the second blender 315 values and pass the multiplied value to a further clipper 318.

In some embodiments the logic circuitry comprises a further clipper 318. The further clipper can be can be configured to receive the output of the second multiplier and clip it to a value 255. The output of the second clipper can in some embodiments be passed to a look-up table 319.

In some embodiments a limit multiplexer 321 can be configured to receive a series of associated limit values such as shown in FIG. 4 by the associated limit values limit 0, limit 1, limit 2, and limit 3 as data input values selectable by the selection input provided from the big noise and the flesh tone status value combinations. The output of the limit multiplexer 321 can be passed to the look up table 319 as a limit input.

The circuit logic in some embodiments comprises a look-up table (LUT) 319 configured to receive the input product of the clipped motion value to generate a non linear TNR K control parameter. The generation of the K parameter, can thus in some embodiments be non linear based on the LUT filling. In some embodiments the LUT can perform any suitable conversion such as for example a scale/inverse/linear/non-linear conversion of the motion value to K value. The LUT can in some embodiments be fully user programmable.

The output of the look-up table 319 can be passed to a limit clipper 325 and a third "limit" multiplier 323.

The application of the look-up table to the output of the multiplier can be shown in FIG. 8 by step 809.

In some embodiments the logic circuit comprises a third multiplier 323 configured to receive the output of the look-up table 319 and output the product of this combination to a divider 327.

Furthermore in some embodiments the logic circuitry comprises a limit clipper 325 configured to clip the output of the look-up table 319 to the limit value and output this value to a clip selection multiplexer 329.

In some embodiments the logic circuitry comprises a divider 327 configured to receive the output of the third or "limit" multiplier 323 and divide the input by a value of 1023. The output of the divider 327 can be passed as a second input to the clip selection multiplexer 329.

In some embodiments the logic circuitry comprises a clip selection multiplexer 329 configured to receive the output of the limit clipper 325 as a first data input, the output of the divider 327 as a second data input and further to receive a selection input shown in FIG. 4 by the clip selection input (clip_select). The output of the clip selection multiplexer 329 can be output to a logic processor 331.

The operation of clipping to limit or applying a second gain at the second multiplier and selection of one of these is shown in FIG. 8 by step 811.

In some embodiments the logic circuitry further comprises a minimiser/low pass filter 331. The minimiser/low pass filter 331 can be configured to receive as a data input the output of the clip selection multiplexer 329 and further receive a low pass filter selection signal to determine whether or not the output of the minimiser/low pass filter processor 331 is either the 3-tap horizontal minimum function of the input signal or a low pass filtered output version. The output of the minimiser/low pass filter 331 can be the K value.

The operation of minimising or low pass filtering is shown in FIG. 8 by step 813. Furthermore the outputting of the K value is shown in FIG. 8 by step 815.

With respect to FIG. 5, a series of examples of the error correction available by performing embodiments of the application are shown. For example in FIG. 5 the first third of the image 401 is shown as the K parameter dump without the use of a compression algorithm such as REMPEG, the second third of the image 403 is the same image K parameter dump after compression showing motion errors occurring through the field/frame and the third of the image 405 is the output following error correction as shown in embodiments of the application.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this application may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multicore processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

We claim:

1. A video processor comprising: a spatio-temporal noise reduction controller configured to determine current and previous image edge slopes and adaptively control a spatio-temporal noise reduction processor to blend current and previous images dependent on the current and previous image edge slope values.

2. The video processor as claimed in claim 1, further comprising a spatio-temporal noise reduction processor configured to blend current and previous images dependent on the spatial noise reduction controller.

3. The video processor as claimed in claim 1, wherein the spatio-temporal noise reduction controller comprises:
   a current image edge slope determiner configured to generate a current image edge slope value;
   a previous image edge slope determiner configured to generate a previous image edge slope value; and
   an edge slope processor configured to determine a blending control signal dependent on the current image edge slope value and previous image edge slope value for the spatio-temporal noise reduction processor.

4. The video processor as claimed in claim 3, wherein the edge slope processor comprises a slope selector configured to select one of the current image edge slope value and the previous image edge slope value and generate the blending control signal value dependent on the selected edge slope value.

5. The video processor as claimed in claim 4, wherein the edge slope processor comprises a slope value generator configured to combine a portion of the selected edge slope value to a blended gain value to generate a slope value, the control signal value being dependent on the slope value.

6. The video processor as claimed in claim 5, wherein the edge slope processor comprises a first blended gain value generator configured to generate the blended gain value dependent on at least one of: the noise level status of the image region, and an image region motion status value.

7. The video processor as claimed in claim 4, wherein the slope selector is configured to select at least one of:
the minimum of the current image edge slope value and the previous image edge slope value,
the maximum of the current image edge slope value and the previous image edge slope value, and
the average of the current image edge slope value and the previous image edge slope value.

8. The video processor as claimed in claim 7, wherein the slope selector is configured to select at least one of the edge slope values dependent on at least one of: a noise level status of the image region, and an image region motion status value.

9. The video processor as claimed in claim 5, wherein the portion of the selected edge slope value is dependent on at least one of: a noise level status of the image region, and an image region motion status value.

10. The video processor as claimed in claim 6, further comprising a motion noise detector configured to determine at least one of: the noise level status of the image region, and the image region motion status value.

11. The video processor as claimed in claim 4 wherein the edge slope processor is configured to selectively nullify the motion noise value for at least one of: image edges, and regions of high frequency image components.

12. The video processor as claimed in claim 1, wherein the current and previous image edge slopes are current luma image edge slopes and previous luma image edge slopes.

13. The video processor as claimed in claim 1, wherein the current and previous images comprise:
a current frame image and a previous frame image respectively; and
a current field image and a previous field image respectively.

14. The video processor as claimed in claim 1 wherein the edge slope value comprises at least one of:
horizontal pixel difference, and
vertical pixel difference.

15. A television receiver comprising the video processor as claimed in claim 1.

16. An integrated circuit comprising the video processor as claimed in claim 1.

17. A video player comprising the video processor as claimed in claim 1.

18. A method of processing video signals comprising:
determining current and previous image edge slopes; and
adaptively controlling spatiotemporal noise reduction blending of current and previous images dependent on the current and previous image edge slope values.

19. The method as claimed in claim 18, further comprising spatio-temporal noise reduction blending of current and previous images dependent on the current and previous image edge slope values.

20. The method as claimed in claim 18, wherein adaptively controlling spatio-temporal noise reduction blending of current and previous images comprises:
generating a current image edge slope value;
generating a previous image edge slope value; and
determining a blending control signal dependent on the current image edge slope value and previous image edge slope value for the spatio-temporal noise reduction processor.

21. The method as claimed in claim 20, wherein determining a blending control signal comprises:
selecting one of the current image edge slope value and the previous image edge slope value; and
generating the blending control signal value dependent on the selected edge slope value.

22. The method as claimed in claim 21, wherein determining a blending control signal comprises combining a portion of the selected edge slope value to a blended gain value to generate a slope value, the control signal value being dependent on the slope value.

23. The method as claimed in claim 22, wherein determining a blending control signal comprises generating the blended gain value dependent on at least one of the noise level status of the image region, and an image region motion status value.

24. The method as claimed in claim 21, wherein selecting one of the current image edge slope value and the previous image edge slope value comprises selecting at least one of:
the minimum of the current image edge slope value and the previous image edge slope value,
the maximum of the current image edge slope value and the previous image edge slope value, and
the average of the current image edge slope value and the previous image edge slope value.

25. The method as claimed in claim 24, wherein selecting one of the current image edge slope value and the previous image edge slope value comprises selecting at least one of the edge slope values dependent on at least one of: a noise level status of the image region, and an image region motion status value.

26. The method as claimed in claim 25, further comprising determining the portion of the selected edge slope value dependent on at least one of: a noise level status of the image region, and an image region motion status value.

27. The method as claimed in claim 23, further comprising determining at least one of: the noise level status of the image region, and the image region motion status value.

28. The method as claimed in claim 27 wherein determining the noise level of the image comprises selectively nulling the motion noise value for at least one of: image edges, and regions of high frequency image components.

29. The method as claimed in claim 18, wherein the current and previous image edge slopes are current luma image edge slopes and previous luma image edge slopes.

30. The method as claimed in claim 18, wherein the current and previous images comprise:
a current frame image and a previous frame image respectively; and
a current field image and a previous field image respectively.

31. The method as claimed in claim 18 wherein the edge slope value comprises at least one of:
horizontal pixel difference, and
vertical pixel difference.

32. A non-transitory computer-readable medium encoded with instructions that, when executed by a processor, perform a method for processing video claimed in claim 18.

33. Apparatus comprising at least one processor and at least one memory including computer code for one or more programs, the at least one memory and the computer code configured to with the at least one processor cause the apparatus to at least perform a method as claimed in claim 18.

34. A video processor comprising:
means for determining current and previous image edge slopes; and means for adaptively controlling spatiotemporal noise reduction blending of current and previous images dependent on the current and previous image edge slope values.

35. The video processor as claimed in claim 34, further comprising means for spatio-temporal noise reduction blending of current and previous images dependent on the current and previous image edge slope values.

36. The video processor as claimed in claim 34, wherein the means for adaptively controlling spatio-temporal noise reduction blending of current and previous images comprises:
means for generating a current image edge slope value;
means for generating a previous image edge slope value; and
means for determining a blending control signal dependent on the current image edge slope value and previous image edge slope value for the spatio-temporal noise reduction processor.

37. The video processor as claimed in claim 36, wherein the means for determining a blending control signal comprises:
means for selecting one of the current image edge slope value and the previous image edge slope value; and
means for generating the blending control signal value dependent on the selected edge slope value.

38. The video processor as claimed in claim 37, wherein the means for determining a blending control signal comprises means for combining a portion of the selected edge slope value to a blended gain value to generate a slope value, the control signal value being dependent on the slope value.

39. The video processor as claimed in claim 38, wherein the means for determining a blending control signal comprises means for generating the blended gain value dependent on at least one of: the noise level status of the image region, and an image region motion status value.

40. The video processor as claimed in claim 37, wherein the means for selecting one of the current image edge slope value and the previous image edge slope value comprises means for selecting at least one of:
the minimum of the current image edge slope value and the previous image edge slope value,
the maximum of the current image edge slope value and the previous image edge slope value, and
the average of the current image edge slope value and the previous image edge slope value.

41. The video processor as claimed in claim 40, wherein the means for selecting one of the current image edge slope value and the previous image edge slope value comprises means for selecting at least one of the edge slope values dependent on at least one of: a noise level status of the image region, and an image region motion status value.

42. The video processor as claimed in claim 38, wherein the means for combining a portion of the selected edge slope value to a blended gain value to generate a slope value comprises means for determining the portion of the selected edge slope value dependent on at least one of: a noise level status of the image region, and an image region motion status value.

43. The video processor as claimed in claim 39, further comprising means for determining at least one of: the noise level status of the image region, and the image region motion status value.

44. The video processor as claimed in claim 34 wherein the means for determining the blending control signal edge slope comprises means for selectively nullifying the motion noise value at least one of: image edges, and regions of high frequency image components.

45. The video processor as claimed in claim 34, wherein the current and previous image edge slopes are current luma image edge slopes and previous luma image edge slopes.

46. The video processor as claimed in claim 34, wherein the current and previous images comprise:
a current frame image and a previous frame image respectively; and
a current field image and a previous field image respectively.

47. The video processor as claimed in claim 34 wherein the edge slope value comprises at least one of:
horizontal pixel difference, and
vertical pixel difference.

* * * * *